United States Patent
Cheon et al.

(10) Patent No.: US 7,480,009 B2
(45) Date of Patent: Jan. 20, 2009

(54) SYNCHRONIZATION SIGNAL DETECTION IN A DIGITAL TELEVISION RECEIVER

(75) Inventors: Jonghwan Cheon, Suwon (KR); Minho Kim, Suwon (KR); Hyunbae Jeon, Seoul (KR); Sergey Zhidkov, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 729 days.

(21) Appl. No.: 11/184,330

(22) Filed: Jul. 19, 2005

(65) Prior Publication Data

US 2006/0077300 A1    Apr. 13, 2006

(30) Foreign Application Priority Data

Oct. 12, 2004    (KR)    ........... 10-2004-0081349

(51) Int. Cl.
H04N 5/06 (2006.01)
H04N 5/04 (2006.01)
H04N 5/21 (2006.01)

(52) U.S. Cl. ......... 348/521; 348/525; 348/725; 348/516; 348/614; 348/537

(58) Field of Classification Search ......... 348/725, 348/726, 614, 525, 521, 513, 500, 507, 508, 348/516, 512, 21, 536, 537; 375/354, 368, 375/365, 373

See application file for complete search history.

(56) References Cited

U.S. PATENT DOCUMENTS

| | | | |
|---|---|---|---|
| 4,912,549 A * | 3/1990 | Altman et al. | 348/496 |
| 6,222,891 B1 * | 4/2001 | Liu et al. | 375/326 |
| 6,233,295 B1 * | 5/2001 | Wang | 375/364 |
| 6,298,100 B1 * | 10/2001 | Bouillet | 375/326 |
| 6,356,598 B1 * | 3/2002 | Wang | 375/321 |
| 6,496,229 B1 * | 12/2002 | Limberg | 348/725 |
| 6,614,490 B2 * | 9/2003 | Hong et al. | 348/725 |
| 6,661,855 B2 * | 12/2003 | Kim | 375/343 |
| 6,667,760 B1 * | 12/2003 | Limberg | 348/21 |
| 6,707,861 B1 * | 3/2004 | Stewart | 375/321 |
| 6,803,966 B2 * | 10/2004 | Hong | 348/500 |

* cited by examiner

Primary Examiner—David L Ometz
Assistant Examiner—Jean W Désir
(74) Attorney, Agent, or Firm—F. Chau & Associates, LLC

(57) ABSTRACT

A digital television (DTV) receiver is provided, comprising: a demodulator that demodulates television signals and outputs equalizer training signals in the form of real (I) and imaginary (Q) data; a sync signal detector, and a phase compensator that offsets the phase of the I and Q data based on the phase offset signal and outputs phase adjusted I data under control of the lock control signal. The sync signal detector comprises: a correlator that correlates the equalizer training signals including the I and Q data; a power calculator that calculates the sum of the power of the correlated I and Q data; a comparator that compares (the sum) against a preset threshold and outputs a compare indication signal; a sync lock controller that monitors the compare indication signal and outputs a lock control signal; and a phase calculator that calculates a phase of the equalizer training signals based on the I and Q data and outputs a phase offset signal based on the compare indication signal.

21 Claims, 10 Drawing Sheets

NO PHASE OFFSET REAL PN511
CORRELATION VALUE

NO PHASE OFFSET IMAGE PN511
CORRELATION VALUE

90 DEGREE ROTATED REAL PN511
CORRELATION VALUE

90 DEGREE ROTATED IMAGE PN511
CORRELATION VALUE

TOTAL POWER

SYNCHRONIZATION SIGNAL DETECTION IN A DIGITAL TELEVISION RECEIVER

BACKGROUND OF THE INVENTION

1. Field of the Invention

The present invention relates to digital television (DTV) receivers, and more particularly to reliable synchronization detection circuits for use therein.

2. Description of the Related Art

Advances in technology now allow for the transmission of digital television (DTV) in the same bandwidth currently used by NTSC (analog) television transmissions. Digital transmission offers improved video and audio reception. The DTV standard for the United States was adopted on Dec. 24, 1996, and allows digital transmission of high quality video and audio signals, in particular high definition television (HDTV). Since the adoption of the digital television (DTV) standard, there has been an ongoing effort to improve the design of DTV receivers.

The primary challenge that faces designers in designing receivers so that they achieve good reception is the presence of multipath interference due to multiple signal paths in the channel. Such multipath interference affects the ability of the receiver to recover signal components such as the carrier and symbol clock. Therefore, designers add equalizers to receivers in order to cancel the effects of multipath interference and thereby improve signal reception. In a multipath environment, it is important to find quickly main path but sometimes it is impossible to determine properly the main path using receivers of the related art.

A DTV receiver includes a tuner, a demodulator, a filter, a sync detector and an equalizer. The data format of the DTV signals are shown in FIG. 1 and FIG. 2.

FIG. 1 is a diagram illustrating the timing structure and dimensions of a digital television (DTV) data field, comprised of a series of 313 segments, the first segment containing an equalizer training sequence, according to the related art. In ATSC DTV systems, frame of data is transmitted in a pair of "odd" and "even" data fields, a one data field being shown in FIG. 1. Each data field contains 313 segments, and each segment contains 832 symbols. The symbol rate for all digital VSB modes is 10.762 MHz and thus, the symbol period T is 92.9 nsec. Thus, in the DTV Frame Format: 1 frame=2 fields (odd field and even field); 1 field=313 segments=1 field sync segment+312 DATA segments.

The transmission (data) segments are compatible with the 188-byte MPEG-2 data packet standard, commonly used throughout the world (including the U.S. DTV standard). Twenty Reed-Solomon parity bytes for every data packet add redundancy for forward error correction (FEC) of up to 10 byte errors/packet. Since Reed-Solomon decoders correct byte errors, and bytes can have anywhere from 1 to 8 bit errors within them, a significant amount of error correction can be accomplished in the DTV receiver.

The first four symbols in each segment are "segment sync" symbols having the sequence [+5, −5, −5, +5]. The repetitive 4-symbol binary segment sync aids in symbol clock recovery and data segment delineation, independently of data. Due to the random nature of the data, the repetitive syncs can be easily extracted from the data through correlation methods, and can provide reliable synchronization down to S/N ratios of 0 dB.

Digital vestigial-sideband (VSB) DTV transmission systems use three supplementary signals for synchronization. A low-level pilot is employed for carrier acquisition, a segment sync (in each segment) for synchronizing the data clock in both frequency and phase, and a data field sync segment for data framing and equalizer training. The low-level pilot is created by adding a DC value to the baseband data, which has zero mean because all the VSB data levels (e.g. 2, 4, 8, or 16) are equiprobable. After modulation, the DC value causes an in-phase pilot to be added to the data spectrum for transmission. Carrier recovery in the receiver of a VSB DTV transmission system is performed using the low-level, inband pilot that is added to the random data signal. The pilot signal may be synchronously detected using a narrowband frequency-and-phase-locked loop (FPLL). A frequency and phase-locked loop (FPLL), combines both a frequency loop and a phase-locked loop into one circuit, and can be employed for both wideband frequency acquisition and narrowband phase tracking. When the FPLL is phase-locked, the detected pilot is constant. Thus, the low-level pilot aids carrier recovery independently of data.

A VSB data field pair (a DTV frame) comprises a first (odd) field (one data field) and a second (even) field (one data field), each of which includes a data field sync segment (the first segment in each data field), data, FEC, and segment syncs. The middle 63 PN sequence of alternate data field sync segments are inverted to identify (odd) Field Sync #1 and (Even) Field Sync #2. The remaining data in the other 312 segments comprises trellis coded 8-level VSB symbols. In a trellis-coded 8-VSB signal there are eight discrete data levels.

In the receiver in VSB DTV transmission system, sync and timing recovery is generally performed with a narrowband phase-locked loop (PLL), using the segment sync signal, independently of the data. Repetitive binary segment syncs, shown in FIGS. 1 & 2, provide the receiver with a means of extracting the clock signal from the otherwise randomized data signal. By using correlation techniques and a narrowband PLL tracking filter, the segment sync can be found and the symbol clock locked to it.

FIG. 2 is a timing diagram of the related art illustrating the timing structure and dimensions of the first segment of the data frame of FIG. 1 containing: a segment sync including a 4-symbol segment sync followed by a training sequence that includes a pseudo-noise sequence having a length of 511 symbols (PN511) followed by three pseudo-noise sequences each having a length of 63 symbols (PN63) followed by 128 symbols which are composed of various mode, reserved, and precode symbols. The binary "VSB Mode" (2/4/8/16) Level ID, shown in FIG. 2, indicates the VSB mode selected for transmission. Thus, in the Field Sync Segment: 4 symbols are the segment sync; 700 symbols (PN511, 3 PN63) are the equalizer training signals; 24 symbols are the VSB Mode difference; and 104 symbols are Reserved.

The DTV data field sync (training) segment (shown in FIG. 2), is one segment long (832 symbols) and repeats in each data field (repeating every 313 segments). The data efficiency (of the data fields) is reduced by only 0.32% ($\frac{1}{313}$) due to the insertion of data field sync (training) segments. The data field sync (training) segment aids in data frame synchronization, again independently of data and down to S/N ratios of 0 dB. The frame sync (training) segment can also be used as a known reference training signal for the receiver equalizer, and as a means of determining received signal conditions (such as S/N ratio) and for determining the main path in a multipath environment.

As shown in FIG. 2, the field sync segment (the first segment of each data field) comprises the four segment sync symbols discussed above followed by a pseudo-noise sequence having a length of 511 binary symbols (PN511) followed in turn by three pseudo-noise sequences each having a length of 63 binary symbols (PN63). Like the segment sync symbols, all four of the pseudo-noise sequences are composed of (binary) symbols from the set {+5, −5}. The center PN63 sequence is inverted in alternate (even) data fields. The pseudo-noise sequences are followed by 128 symbols, which are composed of various mode, reserved, and precode symbols.

Because the first 704 symbols of each field sync segment are known, these symbols, may be used as a training sequence for an adaptive equalizer. All of the three PN63 sequences can be used only when the particular field being transmitted is detected so that the polarity of the center sequence is known.

The 511-symbol PN sequence is used in long equalizers, providing accurate channel (linear) distortion reduction over a large time length. In order to facilitate a short equalizer implementation, three 63-symbol PN sequences are transmitted in the frame sync.

FIG. 3A is a diagram illustrating exemplary correlation values (A, B, C, D, E) of the real part signal (detected at a real part equalizer in a DTV receiver) in a multipath environment. In the multipath environment (see multiple paths indicated by A, B, C, D, E in FIG. 3A), it is important to find quickly main path (indicated in FIG. 3A by the largest correlation value, B). Multipath signals (e.g., A, C, D, E) in the broadcast channel may arrive many symbols after the main signal (B). Since the clock recovery, segment synchronization, and frame synchronization are done independently of each other, and prior to the equalizer, near-theoretical equalizer performance is possible. Also, the use of VSB modulation generally requires only one real (in-phase) equalizer, not two complex ones, and thus the receivers of the related art generally have only one "real" (in-phase) (I-phase) equalizer. But if only the real part signal is used in the synchronization, sometimes it may be impossible for the receivers of the related art to determine properly the main path (B).

FIG. 3B is a diagram comparing a detectable correlation value of the real part signal of main path (B in FIG. 3A) to background NOISE. The correlation value B of the real part signal of main path exceeds a predetermined noise-threshold level, NOISE_TH, and so the receiver of the related art using only a real part equalizer can determine properly the main path (B). If there is no phase offset, the correlation value of the real part signal can represent the whole signal, so according to the correlation value of the real part signal, synchronization is determined. The path having a maximum correlation value (e.g., B) is considered the main path.

The sync detector of a receiver detects the strength and position of multipath signals using the PN511. The sync detector receives the demodulator's output signal which is a real part signal (I), calculates the correlation of the PN511 sequence, to find a main path, and then outputs a locking control signal and sync signals. As previously noted, there are two types of PN sequences (PN511 and PN63) that are a kind of training sequence or training signal.

FIG. 3C is a diagram comparing an undetectable correlation value of the real part signal of the main path to background noise where there is a phase offset. The correlation value B' of the real part signal of main path does not exceed the predetermined noise-threshold level, NOISE_TH, and so the receiver of the related art using only a real part equalizer cannot determine properly the main path (B'). If there is phase offset, the correlation value of the real part of the main path signal is so small that it may be difficult of impossible to synchronize. If the real part signal level is lower than the noise (threshold) level because of the noise or multipath or etc., the sync detector of the receiver of the related art cannot find the main path, so the equalizing speed becomes slow and the performance of the equalizer is lowered.

FIGS. 4A, 4B, 5A, and 5B are timing diagrams showing correlation values. FIGS. 4A and 5A each depict correlations of the real (I) part signal of exemplary main paths. The correlation (a) in FIG. 4A is the Correlation value of Real PN511 with a Zero phase-offset. The correlation (c) in FIG. 5A is the Correlation value of Real PN511 with a 90 degree (rotated) phase-offset.

FIGS. 4B and 5B each depict exemplary correlations of the Imaginary (Q) part signal of exemplary main paths. The correlation (b) in FIG. 4B is the Correlation value of Imaginary PN511 with a Zero phase-offset. The correlation (d) in FIG. 5B is the Correlation value of Imaginary PN511 with a 90 degree (rotated) phase-offset.

FIG. 6 depicts combined correlations (power) of the Imaginary (Q) part signal of one exemplary main path, in the cases of Zero phase-offset or a 90 degree (rotated) phase-offset. In the case of the Zero phase-offset example (a) and (b) (FIGS. 4A and 4B), Real PN511 Correlation value is high and the Imaginary PN511 Correlation value is low, and the total power (correlation) is indicated by (e). In the case of the 90 degree phase-offset example (c) and (d), (FIGS. 5A and 5B) Imaginary PN511 Correlation value is high and the Real PN511 Correlation value is low, but the total is indicated by (e).

Because correlation values of the Real PN511 and Imaginary PN511 vary according to the phase offset (rotation), it is not correct to use only the Real PN511 Correlation Value. But in all cases, the power of the PN511 (summation of the square values of the real part signal and the imaginary part signal) is constant. So if the total (I & Q) power of the PN511 is used, it is possible to find the main path without considering the phase offset.

SUMMARY OF THE INVENTION

Embodiments of the present invention utilize Real (RD) and Imaginary (ID) parts of equalizer training signals in a DTV signal to detect the frame sync segment and to output a phase-corrected real (RD) part signal to an equalizer (EQ). Thus, even when the real part signal (RD) is small, synchronization with the main path of the a DTV signal can be reliably determined from the phase-compensated (phase-corrected) real (I) part signal (RD). The phase-offset can be calculated from the Real and Imaginary PN511 and the calculated phase-offset is used to compensate the phase of real part signal input to the Equalizer.

An embodiment of the present invention provides a digital television (DTV) receiver, comprising: a demodulator that demodulates television signals and outputs equalizer training signals in the form of real (I) data (RD) and imaginary (Q) data (ID); a sync signal detector, comprising: a correlator that correlates the equalizer training signals including the I and Q data; a power calculator that calculates the sum of the power of the correlated I and Q data; a comparator that compares the sum against a preset threshold and outputs a compare indication signal; a sync lock controller that monitors the compare indication signal and outputs a lock control signal; and a phase calculator that calculates a phase of the equalizer training signals based on the I and Q data and outputs a phase offset signal based on the compare indication signal; and a phase compensator that offsets the phase of the I and Q data based on the phase offset signal and outputs phase adjusted I data under control of the lock control signal.

Demodulated signal data (e.g., equalizer training signals) are included in PN511 and PN63, and the phase calculator performs an arc-tangent operation on the I and Q data to calculate the phase of the PN511 I and Q data and the PN63 I and Q data. The phase compensator includes a complex multiplier that rotates the I and Q data by the phase calculated by the phase calculator.

The phase compensator outputs the real (I) data (RD) under control of the lock control signal. The lock control signal is output by the sync lock controller based on detecting a preset number (Threshold2) of occurrences of the compare indication signal at a level indicating a power above a (first threshold) level (e.g., detecting how many times the main path occurs in the same position for 7 fields).

The digital television (DTV) receiver may further comprise a direction circuit (that determines direction based on correlated PN63 data), and a sync signal generator (hat generates sync signals under control of the lock control signal); and an equalizer (that receives the phase adjusted I data from the phase compensator and equalizes the received data).

Another embodiment of the invention provides a method of generating sync signals in a digital television receiver, comprising: demodulating television signals and outputting equalizer training signals in the form of real (I-phase, In-Phase, I) and imaginary (Q-phase, Q) data; detecting a sync signal by: correlating the I and Q data; calculating the sum of the power of the correlated I and Q data; comparing the sum against a preset threshold and outputting a compare indication signal; monitoring the compare indication signal and outputting a lock control signal; and calculating a phase of the equalizer training signals based on the I and Q data and outputting a phase offset signal based on the compare indication signal; and adjusting the phase of the I and Q data based on the phase offset signal and outputting phase adjusted I data under control of the lock control signal.

The equalizer training signals include PN511 and PN63 and the method may further include determining a direction based on correlated PN63 data; and calculating a phase of the PN511 I and Q data and of the PN63 I and Q data.

The lock control signal is output based on a preset number of occurrences (counts) of the compare indication signal at a level indicating (e.g., detecting how many times the main path occurs in the same position for 7 fields).

An arc-tangent operation is performed on the I and Q data to calculate the phase offset value; and the I and Q data is compensated in phase based on the phase offset value.

The compensated I data is equalized and is output under control of the lock control signal and the method generates sync signals under control of the lock control signal.

Another embodiment of the invention provides a sync signal detector, comprising: a correlator that correlates equalizer training signals including I and Q data; a power calculator that calculates the sum of the power of the correlated I and Q data; a comparator that compares the sum against a preset threshold and outputs a compare indication signal; a sync lock controller that monitors the compare indication signal and outputs a lock control signal; a phase calculator that calculates a phase of the equalizer training signals based on the I and Q data and outputs a phase offset signal based on the compare indication signal; and a sync signal generator that generates sync signals for use in synchronizing television signals under control of the lock control signal.

BRIEF DESCRIPTION OF THE DRAWINGS

The embodiments of the present invention will become understood by those of ordinary skill in the art by describing, in detail, exemplary embodiments thereof with reference to the attached drawings.

FIG. 1 is a diagram illustrating the timing structure and dimensions of a data field, comprised of a series of 313 segments, the first segment containing a training sequence, according to the related art;

FIG. 2 is a timing diagram illustrating the timing structure and dimensions of the first segment of the data frame of FIG. 1A, containing a segment sync having a length of 4 symbols followed by a training sequence that includes a pseudo-noise sequence having a length of 511 symbols (PN511) followed by three pseudo-noise sequences each having a length of 63 symbols (PN63), according to the related art;

FIG. 8B is a timing diagram of the a plurality of sync signals output by the Sync Signal Generator of the Sync Signal Detector in FIG. 8;

DETAILED DESCRIPTION OF THE EXEMPLARY EMBODIMENTS

Figure 7:
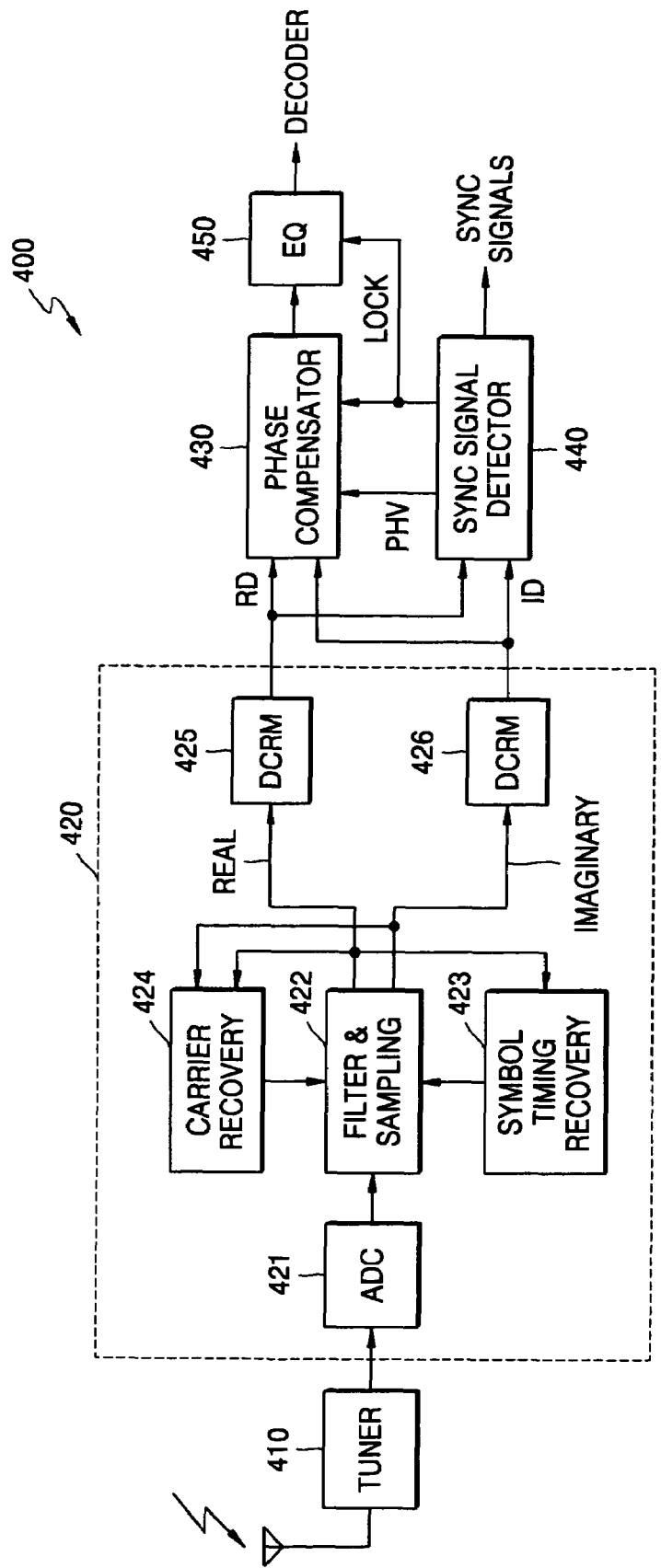
FIG. 7 is a circuit block diagram illustrating a DTV receiver comprising a Sync Signal Detector according to an embodiment of the present invention.

FIG. 7 is a circuit block diagram illustrating a digital television (DTV) receiver comprising a Sync Signal Detector 440 and a Phase Compensator 430 according to an embodiment of the present invention. The DTV receiver comprises related art components including a antenna connected to a tuner (410), a Demodulator circuit 420, and an Equalizer (EQ 450).

The Tuner (410) receives the 6 MHz signal (UHF or VHF) from an external antenna (shown). The Demodulator circuit 420 includes an Analog-to-Digital Converter (ADC 421), a Carrier Recovery circuit (424), a Filtering and Sampling circuit (422) a Symbol Timing Recovery circuit (423), a Real-signal circuit (DCRM 425) and an Imaginary-signal circuit (DCRM 426).

Carrier recovery (424) in the DTV system is performed using the low-level, inband pilot that is added to the random data signal by the transmitter (not shown). The presence of a low-level pilot allows the DTV (VSB) receiver to frequency-lock to the incoming signal directly, without using squaring loops to remove the bi-phase modulation. A frequency and phase-locked loop (FPLL), which combines both a frequency loop and a phase-locked loop into one circuit, can be employed to perform Carrier Recovery.

The goal of Symbol Timing Recovery circuit (423) is to sample message signals at the receiver for best performance. One simple method for recovering symbol timing is performed using a delay-locked loop (DLL). After the in-phase and quadrature signals pass through a matched filter 422, a delay-locked loop in the Symbol Timing Recovery circuit (423) attempts to find the peaks in the output waveforms.

The equalizer/ghost-canceller (EQ 450) compensates for channel distortions, such as multipath distortions, tilt and ghosts. These distortions can originate in the transmission channel (e.g., motion of the receiver, phase distortion) or result from imperfect components within the receiver. Once the DTV receiver has acquired the framing code (equalizer training) sync segment, it can use the pseudo-random sequence in it to generate equalizer training signals to control an adaptive equalizer (EQ 450) to cancel out the effects of the distortions, allowing accurate data demodulation. In embodiments of the present invention the adaptive equalizer (EQ 450) receives phase-corrected real (RD) part signals. Thus, even when the real part signal (RD) is small, accurate data demodulation can be performed with the phase-compensated (phase-corrected) real (I) part signal (RD) according to embodiments of the present invention. The phase-offset is calculated from the Real and Imaginary PN511, and the calculated phase-offset is used to compensate the phase of real part signal input to the Equalizer EQ 450.

The digital television (DTV) receiver of FIG. 7 additionally comprises a Sync Signal Detector 440 and a Phase Compensator 430. The Sync Signal Detector 440 receives the Real (I-Phase) part data (RD) signal and Imaginary (Q-Phase) part (ID) signal from the Demodulator circuit 420 and outputs the SYNC SIGNALS (see FIG. 8B) and a phase-offset signal (PHV) indicating the phase-offset between the Real (I-Phase) part data (RD) signal and Imaginary (Q-Phase) part (ID) signals.

Figure 1:
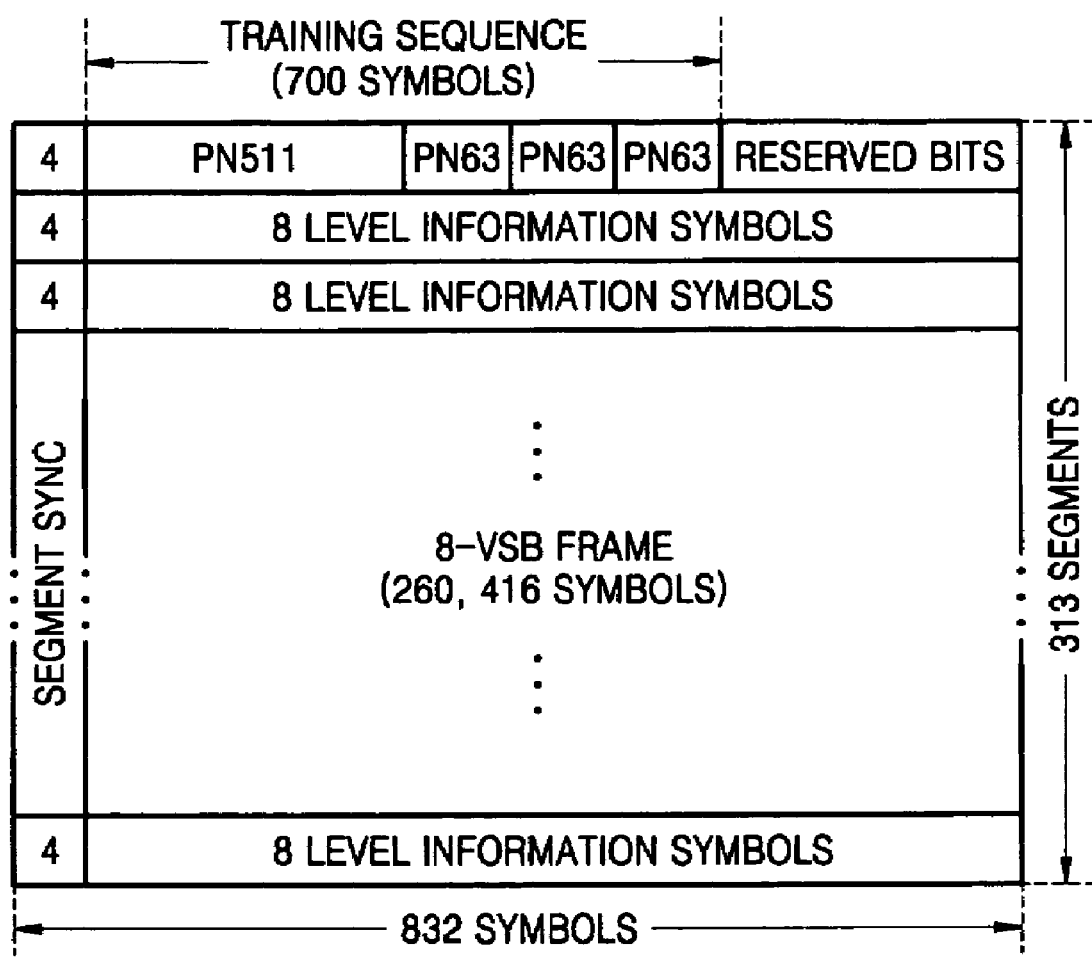
In FIGS. 1, 2 and FIG. 8B, the numerals drawn indicate dimensions (e.g., in units of "segments", "symbols", "levels", and ordinates) rather than element labels. In the other drawings, like elements are represented by like reference numerals.
Figure 2:
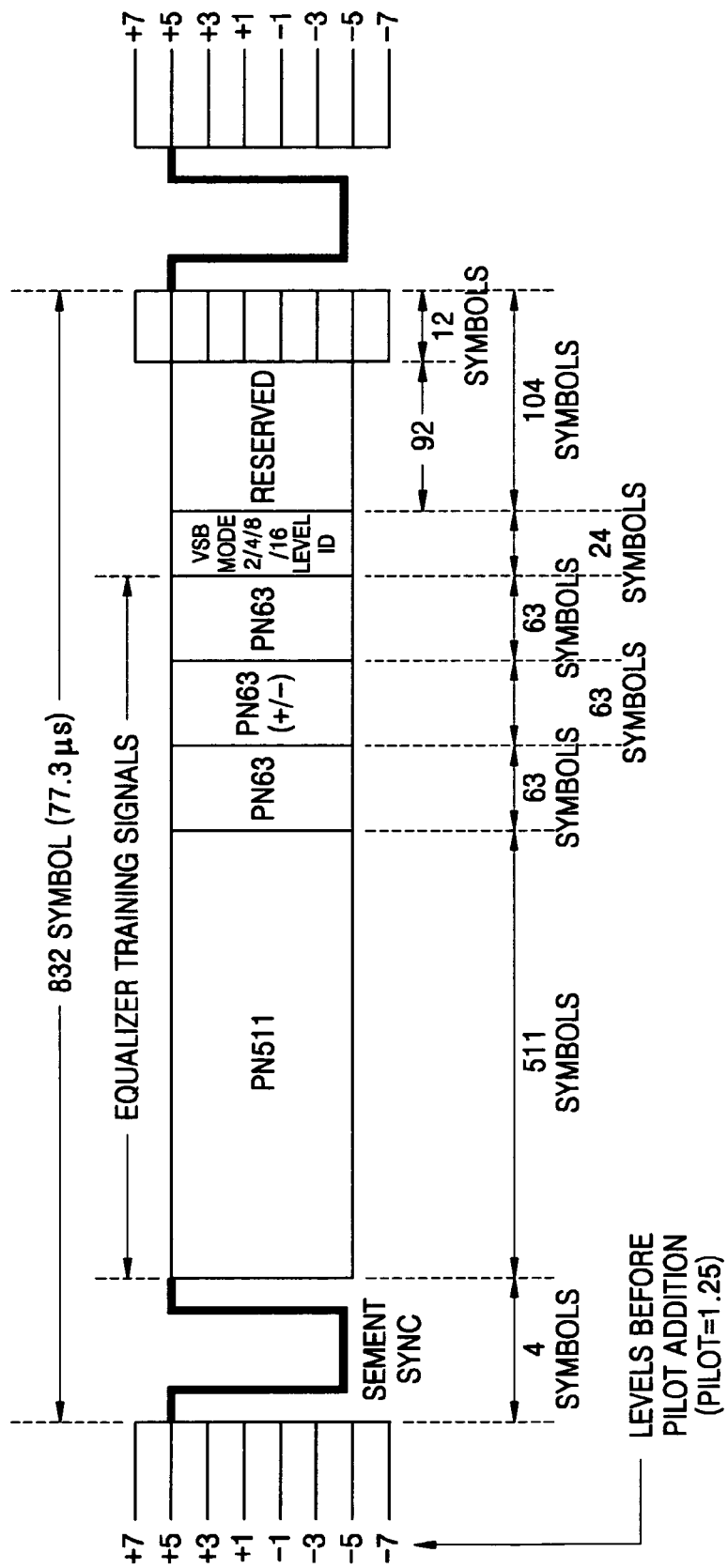
Figure 3A:
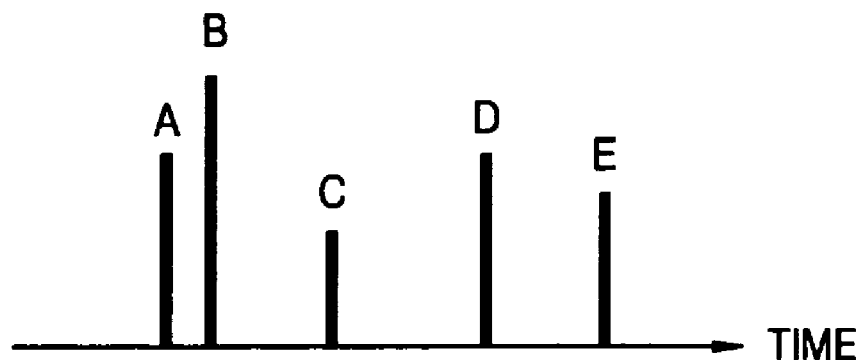
FIG. 3A is a diagram illustrating an example of multipath (A, B, C, D E) profile.
Figure 3B:
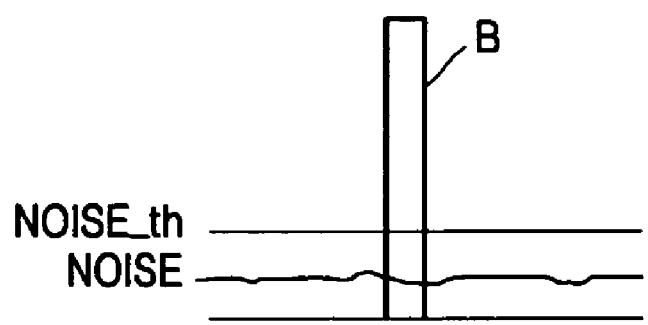
FIG. 3B is a diagram comparing a detectable correlation value of the real part signal of main path B (in FIG. 3A) to background noise.
Figure 3C:
FIG. 3C is a diagram comparing an undetectable correlation value of the real part signal to background noise where there is a phase offset.
Figure 4A:
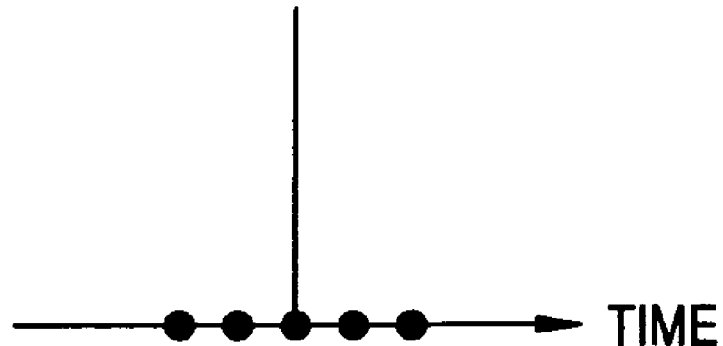
FIGS. 4A and 4B are timing diagrams showing correlation values of the real part of signal of the main path.
Figure 4B:
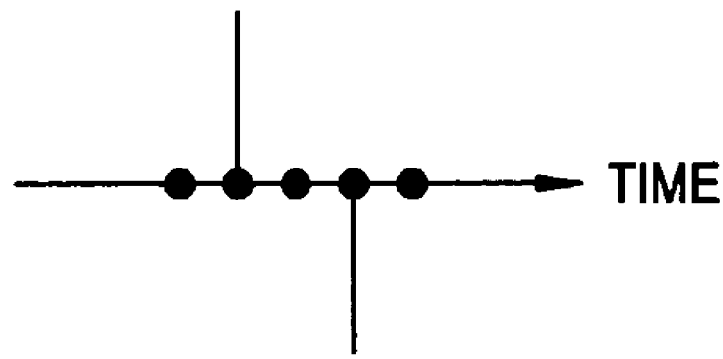
Figure 5A:
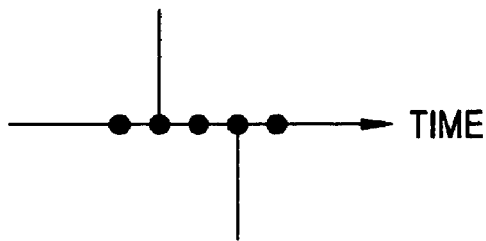
FIGS. 5A and 5B are timing diagrams showing correlation values of the imaginary part of signal of the main path.
Figure 5B:
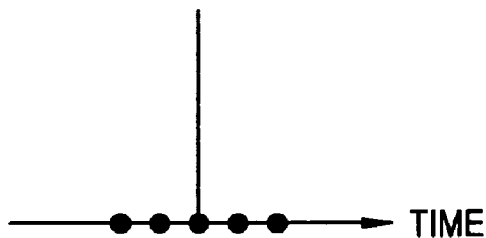
Figure 6:
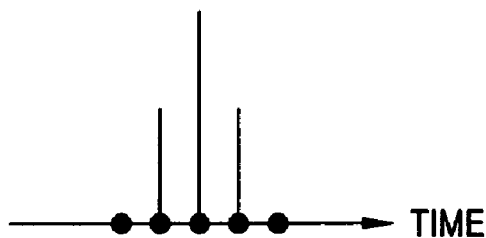
FIG. 6 is a timing diagram showing total power (of real and imaginary parts) of either 4A and 4B or 5A and 5B.
Figure 8A:
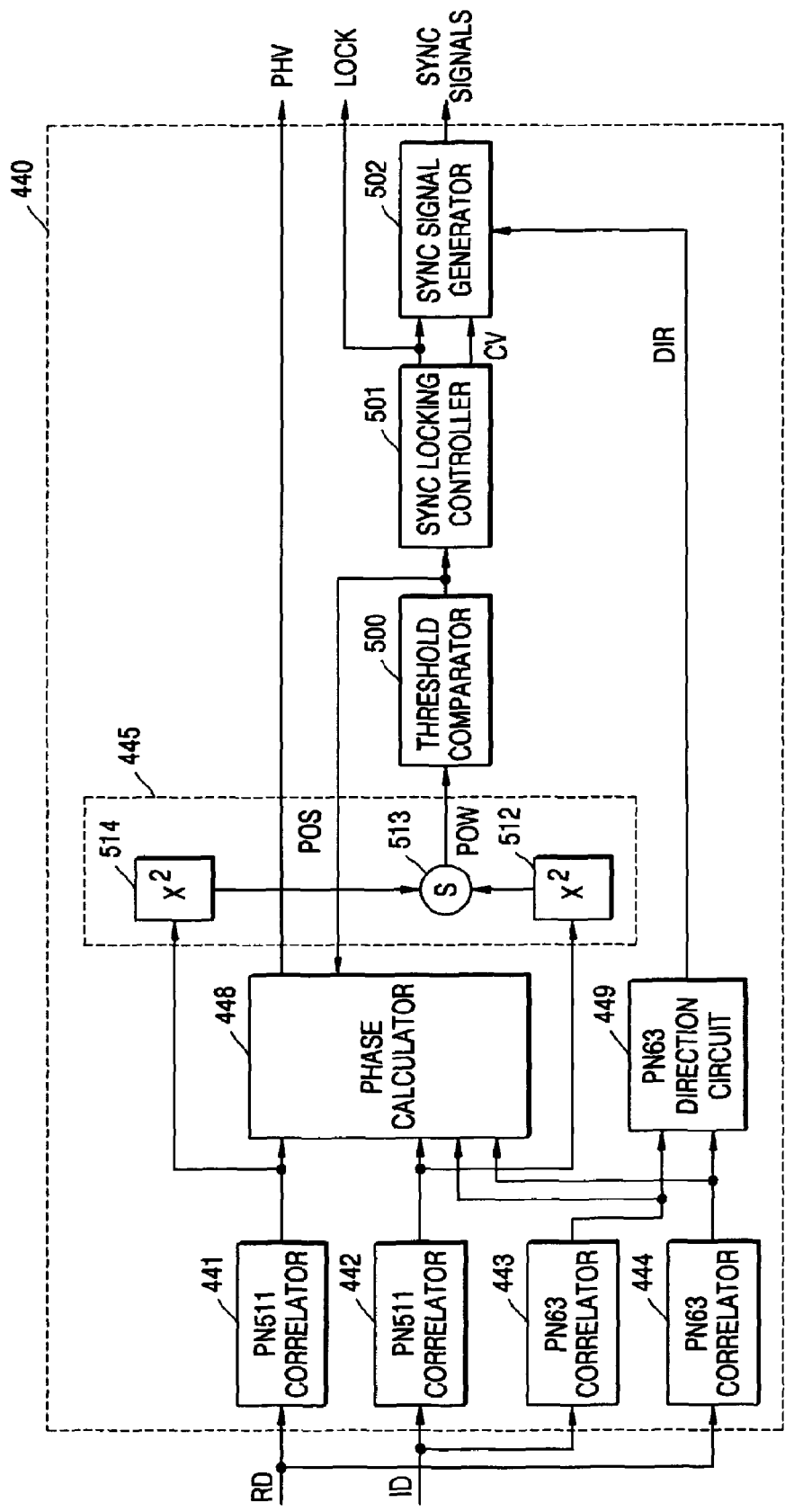
FIG. 8A is a detailed circuit block diagram illustrating the Sync Signal Detector in the DTV receiver of FIG. 7.

The Sync Signal Detector 440 detects the periodic sync segments (see FIGS. 1 & 2) of each received data field by correlating a stored replica pseudo-noise code (e.g., PN511) with the synchronously detected pseudo-random data (PN511) encoded in the received sync segments for framing and equalizer training. Referring to FIG. 8A, the Sync Signal Detector 440 includes a pair of 511-symbol correlators (see 441 to 442 in FIG. 8A) and a pair of 63-symbol correlators (see 443 & 444 in FIG. 8A), looks for the frame (field) sync segments (framing code segment) occurring at the specified repetition rate (once every data field). When the periodic Frame (Field) sync segment is detected, the Sync Signal Detector 440 is enabled to Lock on the sampled frame (field) sync segment and achieves frame/field synchronization. Upon reaching a predefined level of confidence (using a threshold comparator 500 in FIG. 8A) that the frame (field) sync segment has been found, subsequent receiver circuits are clocked accordingly by the Sync Signals output by a Sync Signal Generator (502 in FIG. 8A) activated by the synchronization LOCK signal.

The Phase Compensator 430 receives equalizer training signals, consisting of pseudonoise PN sequences (e.g., PN511), in the form of Real (I-Phase) part data (RD) and Imaginary (Q-Phase) part data (ID) signals from the Demodulator circuit 420, and receives the phase offset value (PHV) and the lock control signal (LOCK) from the Sync Signal Detector 440, and outputs the phase-corrected real (I) part data (RD) signal to the equalizer (EQ 450) under control of the lock control signal (LOCK). The Phase Compensator 430 receives the real part signal (RD) and eliminates the phase offset (as indicated by signal PHV) from the real part signal (RD) and outputs a phase-compensated real part signal (RD) to the equalizer (EQ 450).

FIG. 8A is a detailed circuit block diagram illustrating the Sync Signal Detector 440 in the DTV receiver of FIG. 7. The Sync Signal Detector 440 receives the real (I-phase, In-Phase, I) and imaginary (Q-phase, Q) data and generates frame SYNC SIGNALS (see FIG. 8B), and a LOCK control signal, and a phase offset value (PHV) which is a phase difference.

The Sync Signal Detector 440 comprises: Correlators 441-444; a Phase Calculator 448; a PN63 Direction Circuit 449; Squaring circuits 512 & 514; a Summing circuit 513; a Threshold Comparator 500; a Sync Locking Controller 501; and a Sync Signal Generator 502.

Each one of the Correlators (441, 442, 443, and 444) receives either RD or ID signals and outputs a correlation value based thereon. Each of the correlators performs a correlation function between all received bits of the input equalizer training data and a pre-loaded synchronization word (e.g., an PN511 codes).

The received I or Q equalizer training data input to each of the Correlators (441, 442, 443, and 444) are delayed (e.g., by some sampling units) and multiplied (e.g., by some stored register values) therein, and the products are output as the correlation values. The register values are pre-set correlation constants stored in registers (not shown).

The outputs of I Correlators 441 & 444 are a digital bit stream representing the sample-by-sample correlation of the received real (I) equalizer training data RD with the stored synchronization word replica (in a memory not shown) for the PN511 and PN63 portions of the segment, respectively. The I correlation function exhibits a peak when an I sync word is located in the received sampled real (I) data (RD). Similarly, Q correlators 442 & 443 each perform a correlation function between the pre-stored quadrature Q sync word replicas (e.g., Q PN511 and PN63, stored in a memory not shown) and the received sampled quadrature (Q) data (ID). The outputs of a corresponding pair of I and Q correlators 441 and 442 are applied to squaring clocks 514 and 512, respectively within the Power Calculator Unit 445.

The Power Calculator Unit 445 comprise 2 squaring blocks (512 & 514) and summing block 513. The Power Calculator Unit 445 outputs a signal (to the Threshold Comparator 500) that representing the total correlation (power) by squaring the I and Q PN511 correlation values and adding the squared values.

The output signals of the squaring blocks 511 and 512 represent the squared values of the separate I and Q correlation operations, respectively. The squaring block outputs are then applied to summing block 513 to obtain the total I and Q correlation (power). The squared I and Q correlation signals are thus summed together to form a squared envelope signal which represents the sum of squares of the I and Q correlation signals.

In the absence of a channel-induced phase shift (e.g. a phase offset caused by a radio channel having a random and highly variable shift in the phase), a large amplitude of the squared envelope of the correlation signal (signal output from summing block 513) indicates a correlation in the real (I) part data (RD) signal and indicates an explicit basis for the determination of a (main path) start location for a particular sync segment.

If there is no phase offset, the correlation value of the real (I) part data (RD) signal can represent the whole signal, so synchronization may be determined according to the correlation value of the real (I) part data (RD) signal (the path having a maximum correlation value being considered the main path). However, when there is a phase shift (e.g. a phase offset caused by a radio channel having a random and highly variable shift in the phase), a phase ambiguity or multipath distortion may prevent rapid and precise determination of the main path from the real (I) part signal (RD). If there is phase offset, though the original signal is the main path, the correlation value of the real (I) part data (RD) signal will be small. The output of summing block 513 is then routed the Threshold Comparator 500, wherein the summed correlation signal is compared with a predetermined (noise) threshold value.

The Threshold Comparator (500) compares the total correlation (power) with a predetermined (noise) threshold value and enables a determination of the main path, which has the maximum power. The (noise) threshold value represents the minimum allowable correlation value which would represent a detected sync segment. If the summed output is greater than the (noise) threshold value, a sync segment detection signal is generated and applied to SYNC LOCKING CONTROLLER 501.

The Phase Calculator (448) calculates the phase of the received VSB signals using PN511 correlation values of Real (I) Data (RD) and Imaginary (Q) Data (ID) and generates the phase (offset) value (PHV), which is a phase difference. If the PN63 correlation values of Real (I) Data (RD) and Imaginary (Q) Data (ID) are used, it is possible to calculate more exactly. The Phase Calculator (448) is described in greater detail in connection with FIG. 9.

The PN63 Direction Circuit (449) outputs the direction signal (DIR) according to the PN63 (I & Q) correlation values. For example, if the PN63 correlation value represents the "odd" field of a data frame, the DIR signal is output in a HIGH state and if the PN63 correlation value represents the "even" field of a data frame, the DIR is output in a LOW state.

The Sync Locking Controller (501) counts the number of periodic occurrences that the max total correlation (power) exceeds the (noise) threshold (indicating the mainpath), and upon a predetermined threshold number of counts outputs LOCK (locking control signal) and CV (count) signal. If the counted number is larger than the threshold number of counts, the LOCK is high and SYNC SIGNALS are locked and the sync signal generator (502), the phase compensator (430) and the equalizer (450) operate. The Sync Signal Generator (502) outputs the SYNC SIGNALS illustrated in FIG. 8B upon activation by the synchronization lock signal LOCK.

Figure 8B:
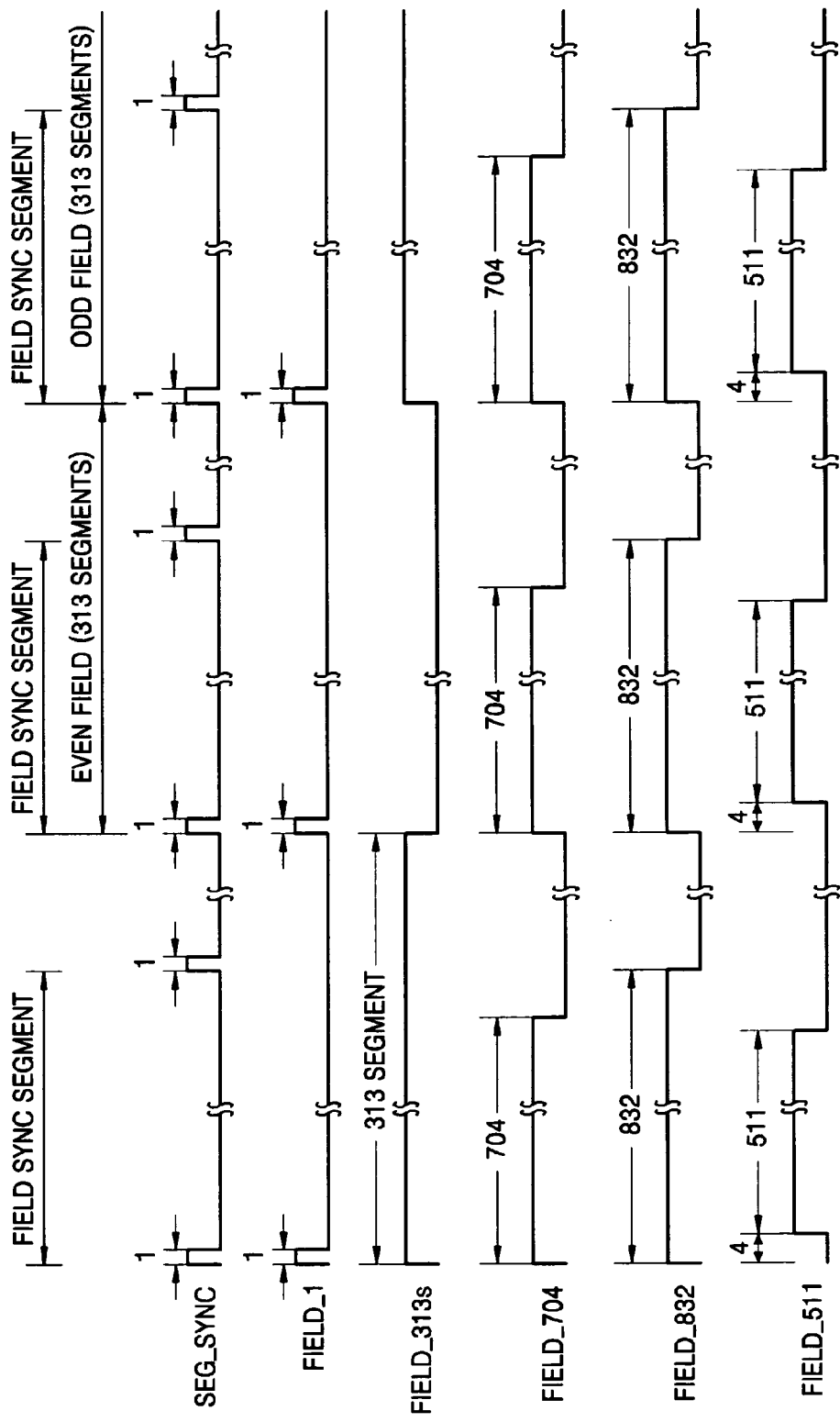

FIG. 8B is a timing diagram illustrating the plurality of sync signals (not all in the same scale) output by the Sync Signal Generator (502) of the Sync Signal Detector 440 in FIGS. 7 and 8A when a synchronization lock LOCK signal is active.

The Segment synchronization signal (SEG_SYNC) is logic high during one symbol per segment. The Field synchronization signal (FIELD_1) is logic high during one symbol per (odd or even) data field, and at the same symbol that Segment synchronization signal is logic high. The 313-segment synchronization signal (FIELD_313s) alternates between logic state with a period of 313 segments to indicate whether the current data field is an Odd or an Even Field. The 704-symbol synchronization signal (FIELD_704) is logic high during the first 704 symbols (704=4 symbols (segment sync)+511 symbols (PN511)+189 symbols (3×PN63) ) of each first segment (sync segment) of each data field. The 832-symbol synchronization signal (FIELD_832) is logic high during the first 832 symbols of the first segment per each data field. The 511-symbol synchronization signal (FIELD_511) is logic high during 511 symbol long pseudonoise equalizer training signal PN511 of each data field.

Figure 9:
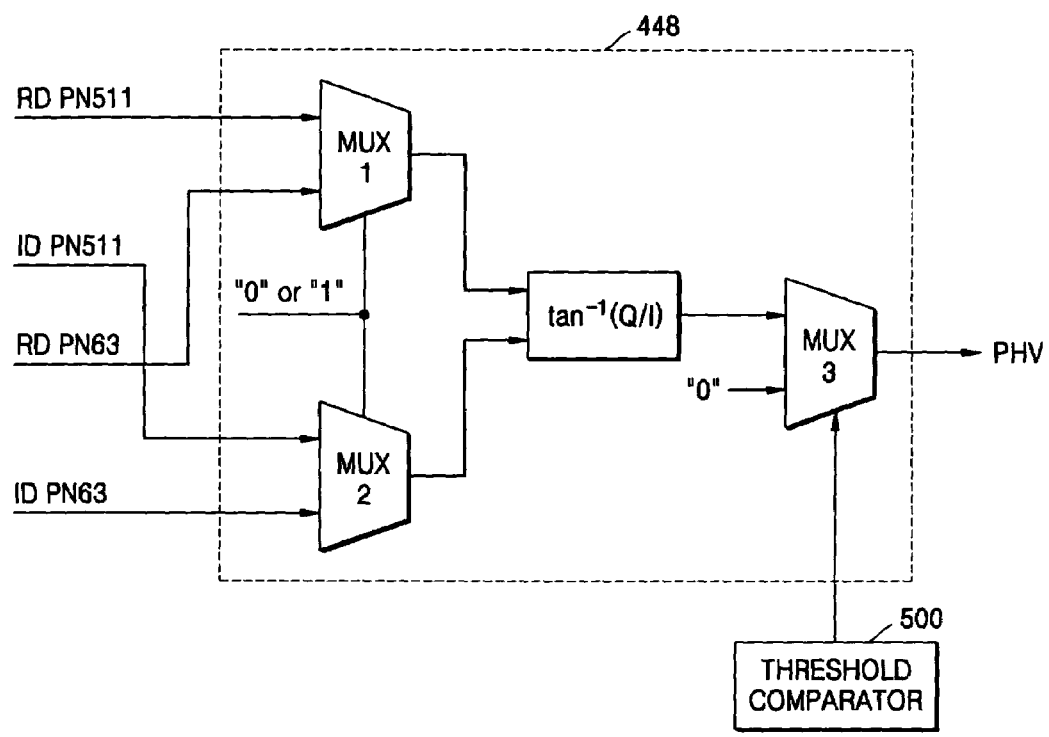
FIG. 9 is a detailed circuit block diagram illustrating the Phase Calculator in the Sync Signal Detector of FIG. 8A, using tan−1 (Q/I)

FIG. 9 is a detailed circuit block diagram illustrating the Phase Calculator 448 in the Sync Signal Detector of FIG. 8A. The Phase Calculator (448) calculates the phase difference between the PN511 I and Q data (and/or of the PN63 I and Q data) by performing an arc-tangent operation on the I and Q data. The arc-tangent operation is performed on the Real (I) data (RD) and the Imaginary (Q) data (ID) to calculate the phase (offset) value (PHV). The arctangent operation is performed in a arctangent circuit labeled $\tan^{-1}(Q/I)$, wherein Real (I) data (RD) and the Imaginary (Q) data (ID) are its inputs and active phase (offset) value PHV is its output. The arctangent circuit labeled $\tan^{-1}(Q/I)$ may include an arctangent lookup table (not shown) that may be used to perform the arc-tangent operation and may be implemented as a read only memory or CORDIC.

The I and Q inputs to the arctangent circuit labeled $\tan^{-1}(Q/I)$ are dynamically selectable by the commonly controlled multiplexers MUX1 and MUX2 which operating together select between a first pair of I and Q data (RD PN511 & ID PN511) or a second pair of I and Q data (RD PN63 & ID PN63), based upon the logic value ("1" or "0") of their commonly connected control inputs. A third multiplexer MUX3 functions as an AND-gate to output a selected one of either the arctangent (of the I and Q signals) or a null signals "0" as the phase (offset) value PHV, based on the signal output by the Threshold Comparator 500 (see. FIG. 8A).

Figure 10:
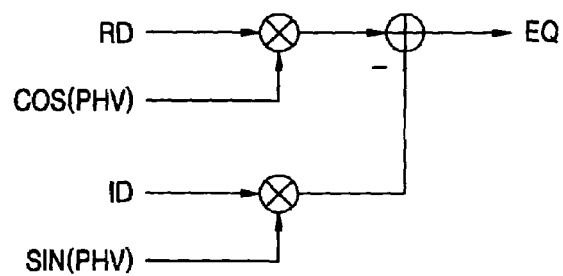
FIG. 10 is a detailed circuit block diagram illustrating the Phase Compensator in the digital television receiver DTV of FIG. 7.

FIG. 10 is a detailed circuit block diagram illustrating the Phase Compensator 430 in the digital television receiver DTV of FIG. 7. The Phase Compensator 430 includes a complex multiplier MX1 operatively coupled to a multiplexer MUX4. The complex multiplier MX1 rotates the I and Q data by the phase (offset value PHV) difference calculated by the Phase Calculator 448. The Multiplexer functions as an AND-gate to output a selected one of either the phase adjusted I data or a null signals "0" to the equalizer EQ 450 under control of the lock control signal LOCK. Thus, the Phase Compensator 430 offsets the phase of the I and Q data based on the real and imaginary component of the phase offset signal (PHV) and outputs phase adjusted I data (under control of the lock control signal). RPHV is the complex signal of cosine(PHV), for real part; IPHV is the complex signal of sine(PHV), for the imaginary part.

Figure 11:
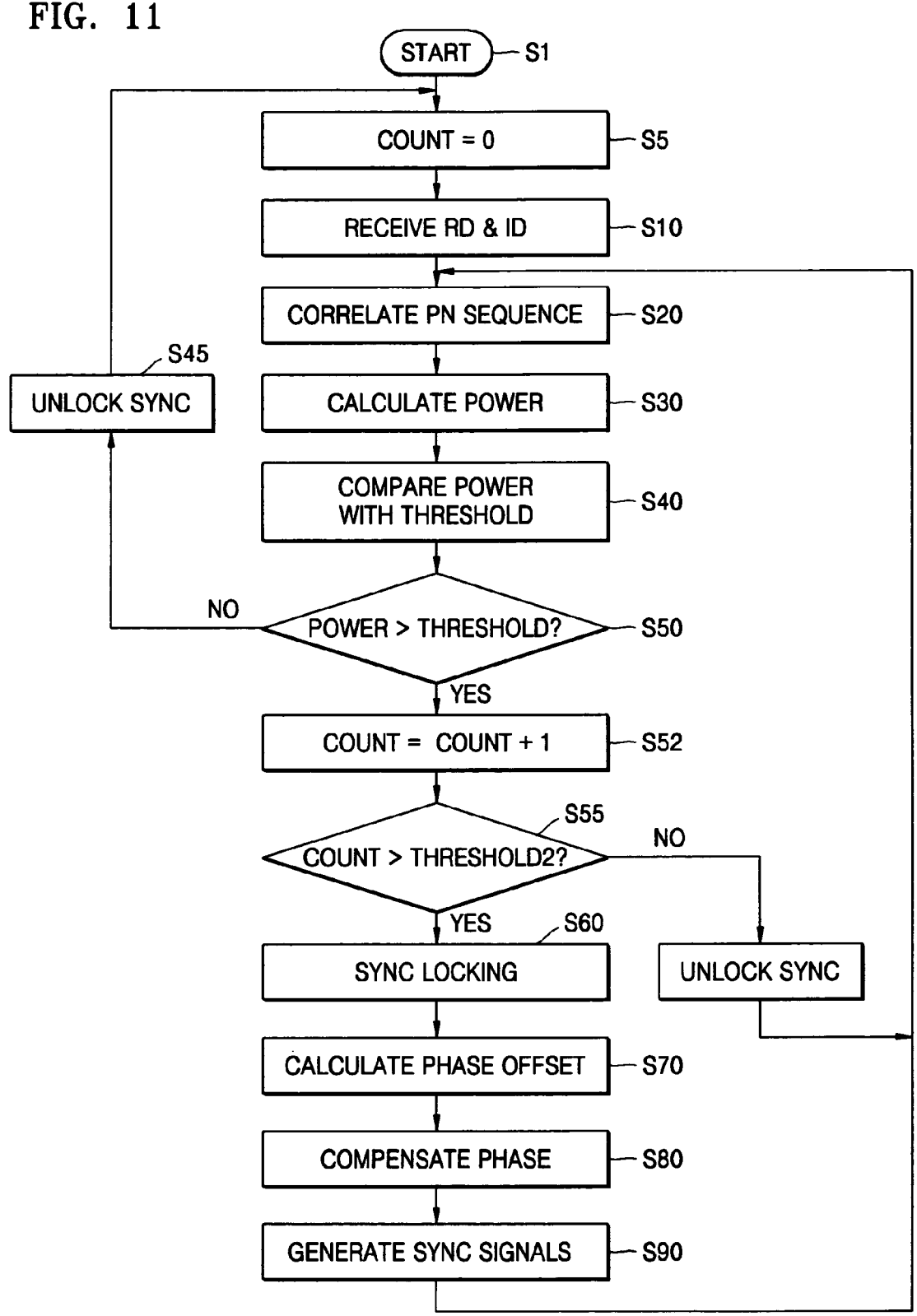
FIG. 11 is a flow chart illustrating a method of generating sync signals in a digital television receiver, according to an embodiment of the present invention.

FIG. 11 is a flow chart illustrating a method of generating sync signals in a digital television receiver according to an embodiment of the present invention. The method starts in step S1 upon the availability of demodulated digital television (DTV) signals including equalizer training signals in the form of real (I-phase, In-Phase, I) data (RD) and imaginary (Q-phase, Q) data (ID). In Step S5, a Counter COUNT is reset to zero. The available real (I-phase, In-Phase, I) data (RD) and imaginary (Q-phase, Q) data (ID) are received in step S10.

A segment sync signal of the main path is detected as follows: In step S20, each of the I and Q data (equalizer training signals) of a PN sequence (e.g., PN511) is correlated with a replica PN sequence. In some embodiments of the invention, the equalizer training signals may include both PN511 and PN63 sequences and the method may further include: determining a direction (indicating Odd or Even fields) based on correlated PN63 data; and calculating a phase offset of the PN511 I and Q data and of the PN63 I and Q data.

In step S30, the total of the combined power of the correlated I and Q data is calculated. In step S40, the sum of the combined power of the correlated I and Q data is calculated in step S30 is compared with a predetermined (noise) Threshold. Step S40 may be performed by threshold comparator 500 in FIG. 8A. If, in decision branch step S50, the calculated Power (from step S30) is greater than the (noise) Threshold, (YES), then an active compare indication signal is output and steps S52 and S55 are next performed, and steps S60, S70, S80, and S90 may be performed. If instead, in decision branch step S50, the calculated Power (from step S30) is less than the (noise) Threshold, (NO), then step S45 (unlocking synchronization) is performed, and the counter COUNT is reset to zero (S5) and steps S10, S20, S30, and S40 are repeated until the calculated Power (from step S30) is greater than the (noise) Threshold (YES).

If, in decision branch step S50, the calculated Power (from step S30) is greater than the (noise) Threshold, (YES), then the counter COUNT will be incremented (step S52) and then compared (S55) with a predetermined (integer) number (Threshold2). If the counter COUNT is detected (in StepS55) to be greater than the predetermined number, steps S60, S70, S80, and S90 are next performed. If, for example, the predetermined number (Threshold2) is 6, then Steps S60, S70, S80 will be performed while the counter Count is 7 or more. In other embodiments of the invention, the counter Count may be decremented (e.g., in place of Step 5), instead of being reset to zero (Step S5), in the event that (in decision branch step S50), the calculated Power (from step S30) is less than the (noise) Threshold, (NO). In other embodiments of the invention, the counter Count can be limited to a certain maximum count value (e.g., 7, 8, 9, etc. where Threshold2=6), instead of being always incremented (Step S52). Thus, the counter COUNT function as a "lookback window", for determining the number of that times the calculated Power (from step S30) was greater than the (noise) Threshold, (YES), within the "lookback window" (e.g. of seven fields).

In step S60, a lock control signal (LOCK) indicating a Synchronization Lock is asserted by monitoring the compare indication signal from step S50. Step S60 may be performed by sync locking controller 501 in FIG. 8A. The lock control signal may be output based on a preset number of occurrences of the compare indication signal at while the sum of the power exceeds the preset (noise) threshold.

In step S70, the Phase-Offset between the I and Q data is calculated and output as a phase-offset signal PHV. Thus, step S70 includes calculating a phase of the equalizer training signals based on the I and Q data and outputting a phase offset signal PHV (e.g., based upon the compare indication signal). Calculating the phase-offset of the I and Q data may include performing arc-tangent operation on the I and Q data to calculate the phase offset value PHV. Step S70 may be performed by the phase calculator 448 in FIG. 8A. In step S80, the Phase-Offset between the I and Q data is corrected (compensated for) using the calculated phase-offset (signal PHV). Thus, step S80 includes adjusting the phase of the I and Q data based on the phase offset signal PHV and outputting phase adjusted Real (I) data (RD) under control of the lock control signal. The compensated (phase adjusted) Real I data is equalized and is output under control of the lock control signal LOCK and the method then generates sync signals under control of the lock control signal. Step S80 may be performed by the Phase Compensator 430 in FIG. 7. In step S90, a plurality of useful Sync Signals (e.g., as detailed in FIG. 8B) are generated based upon the sync LOCK signal asserted in FIG S60. Step S90 may be performed by the Sync Signal Generator in FIG. 8A.

Having thus described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A digital television (DTV) receiver, comprising:
   a demodulator that demodulates television signals and outputs equalizer training signals in the form of real (I) and imaginary (Q) data;
   a sync signal detector, comprising:
      a correlator that correlates the equalizer training signals including the I and Q data;
      a power calculator that calculates the sum of the power of the correlated I and Q data;
      a comparator that compares the sum against a preset threshold and outputs a compare indication signal;
      a sync lock controller that monitors the compare indication signal and outputs a lock control signal; and
      a phase calculator that calculates a phase of the equalizer training signals based on the I and Q data and outputs a phase offset signal based on the compare indication signal; and
   a phase compensator that offsets the phase of the I and Q data based on the phase offset signal and outputs phase adjusted I data under control of the lock control signal.

2. The digital television (DTV) receiver of claim 1, wherein the equalizer training signals include PN511 and PN63.

3. The digital television (DTV) receiver of claim 2, further including a direction circuit that determines direction based on correlated PN63 data.

4. The digital television (DTV) receiver of claim 2, wherein the phase calculator calculates phase of the PN511 I and Q data and the PN63 I and Q data.

5. The digital television (DTV) receiver of claim 1, wherein the sync lock controller outputs the lock control signal based on a preset number of occurrences of the compare indication signal at a level indicating the sum of the power exceeding the preset threshold.

6. The digital television (DTV) receiver of claim 1, wherein said phase calculator performs an arc-tangent operation on the I and Q data to calculate the phase.

7. The digital television (DTV) receiver of claim 6, wherein said phase compensator includes a complex multiplier that rotates the I and Q data by the phase calculated by the phase calculator.

8. The digital television (DTV) receiver of claim 1, wherein the phase compensator outputs the I data under control of the lock control signal.

9. The digital television (DTV) receiver of claim 1, further including a sync signal generator that generates sync signals under control of the lock control signal.

10. The digital television (DTV) receiver of claim 1, further including an equalizer that receives the phase adjusted I data from the phase compensator and equalizes the received data.

11. A method of generating sync signals in a digital television receiver, comprising:
   demodulating television signals and outputting equalizer training signals in the form of real (I) and imaginary (Q) data;
   detecting a sync signal by:
      correlating the I and Q data;
      calculating the sum of the power of the correlated I and Q data;
      comparing the sum against a preset threshold and outputting a compare indication signal;
      monitoring the compare indication signal and outputting a lock control signal; and calculating a phase of the equalizer training signals based on the I and Q data and outputting a phase offset signal based on the compare indication signal; and adjusting the phase of the I and Q data based on the phase offset signal and outputting phase adjusted I data under control of the lock control signal.

12. The method of claim 11, wherein the equalizer training signals include PN511 and PN63.

13. The method of claim 12, further including determining a direction based on correlated PN63 data.

14. The method of claim 12, further including calculating a phase of the PN511 I and Q data and the PN63 I and Q data.

15. The method of claim 11, wherein the lock control signal is output based on a preset number of occurrences of the compare indication signal at a level indicating the sum of the power exceeding the preset threshold.

16. The method of claim 11, wherein an arc-tangent operation is performed on the I and Q data to calculate the phase offset value.

17. The method of claim 16, wherein the I and Q data is compensated in phase based on the phase offset value.

18. The method of claim 11, wherein the compensated I data is output under control of the lock control signal.

19. The method of claim 11, further including generating sync signals under control of the lock control signal.

20. The method of claim 11, further including equalizing the compensated I data.

21. A sync signal detector, comprising:
- a correlator that correlates equalizer training signals including I and Q data;
- a power calculator that calculates the sum of the power of the correlated I and Q data;
- a comparator that compares the sum against a preset threshold and outputs a compare indication signal;
- a sync lock controller that monitors the compare indication signal and outputs a lock control signal;
- a phase calculator that calculates a phase of the equalizer training signals based on the I and Q data and outputs a phase offset signal based on the compare indication signal; and
- a sync signal generator that generates sync signals for use in synchronizing television signals under control of the lock control signal.

* * * * *